United States Patent
Kim et al.

(10) Patent No.: US 9,092,812 B2
(45) Date of Patent: Jul. 28, 2015

(54) METHOD AND SYSTEM FOR DISTRIBUTING BUSINESS APPLICATION AND CONTENTS FOR MOBILE EQUIPMENT USING APPLICATION STORE AND WIRELESS AP

(75) Inventors: Jee Eun Kim, Incheon (KR); Hye Jung Kim, Gunpo-si (KR); Chae Eun Oh, Seoul (KR)

(73) Assignee: KT Corporation, Seongnam-si (KR)

( * ) Notice: Subject to any disclaimer, the term of this patent is extended or adjusted under 35 U.S.C. 154(b) by 747 days.

(21) Appl. No.: 13/363,976

(22) Filed: Feb. 1, 2012

(65) Prior Publication Data

US 2012/0197765 A1    Aug. 2, 2012

(30) Foreign Application Priority Data

Feb. 1, 2011   (KR) .................. 10-2011-0010253

(51) Int. Cl.
| | |
|---|---|
| G06Q 30/00 | (2012.01) |
| H04W 4/02 | (2009.01) |
| G06Q 30/06 | (2012.01) |
| H04W 64/00 | (2009.01) |

(52) U.S. Cl.
CPC ........ *G06Q 30/0601* (2013.01); *G06Q 30/0641* (2013.01); *H04W 4/02* (2013.01); *H04W 64/00* (2013.01)

(58) Field of Classification Search
CPC ..... G06Q 30/0601; H04W 4/02; H04W 64/00
USPC ................. 705/26.1, 27.1; 455/456.1, 456.2, 455/456.3, 456.6
See application file for complete search history.

(56) References Cited

U.S. PATENT DOCUMENTS

| | | | | |
|---|---|---|---|---|
| 7,890,376 | B2* | 2/2011 | Barrese et al. | 705/26.9 |
| 8,010,628 | B2* | 8/2011 | Finlaw | 709/218 |
| 8,396,490 | B2* | 3/2013 | Platt et al. | 455/456.2 |
| 8,396,759 | B2* | 3/2013 | Mehta et al. | 705/26.7 |
| 8,886,569 | B2* | 11/2014 | Patel et al. | 705/64 |
| 2005/0097185 | A1* | 5/2005 | Gibson et al. | 709/217 |
| 2006/0099964 | A1* | 5/2006 | Barrese et al. | 455/456.3 |
| 2007/0153722 | A1* | 7/2007 | Gillies et al. | 370/328 |
| 2008/0049722 | A1* | 2/2008 | Yuen et al. | 370/352 |
| 2010/0321507 | A1* | 12/2010 | Larsen et al. | 348/192 |
| 2010/0332339 | A1* | 12/2010 | Patel et al. | 705/26 |
| 2011/0055874 | A1* | 3/2011 | Libin et al. | 725/62 |
| 2011/0177829 | A1* | 7/2011 | Platt et al. | 455/456.2 |

(Continued)

FOREIGN PATENT DOCUMENTS

| | | |
|---|---|---|
| KR | 1020050040875 A | 5/2005 |
| KR | 1020060098419 A | 9/2006 |

OTHER PUBLICATIONS

Heltzel, P., et al., "No-Hassle Networking Guide, The", PC World, May 2002, vol. 20, No. 5, pp. 86-101.*

(Continued)

*Primary Examiner* — Nicholas D Rosen
(74) *Attorney, Agent, or Firm* — Sughrue Mion, PLLC

(57) ABSTRACT

A method and a system that automatically searches an application store corresponding to the Internet Protocol (IP) address of a connected Access Point (AP) for applications and content with a smart mobile device (mobile terminal) by which a user can download the desired applications and that notifies a user of the results of the search, thus allowing the user to install the applications without requiring a separate search operation.

18 Claims, 6 Drawing Sheets

(56) References Cited

U.S. PATENT DOCUMENTS

2011/0320307 A1* 12/2011 Mehta et al. .................. 705/26.7
2013/0205196 A1* 8/2013 Han et al. ...................... 715/234

OTHER PUBLICATIONS

Randall, N., "Extending Your Wireless and Wired Networks", PC Magazine Online, Mar. 20, 2006.*

* cited by examiner

FIG. 5

| UNIQUE IDENTIFIER | CATEGORY | BRAND NAME | AP IP |
|---|---|---|---|
| OGADA Coffee | drink | OGADA | 10.16.1.2 |
| ... | ... | ... | ... |

METHOD AND SYSTEM FOR DISTRIBUTING BUSINESS APPLICATION AND CONTENTS FOR MOBILE EQUIPMENT USING APPLICATION STORE AND WIRELESS AP

CROSS-REFERENCE TO RELATED APPLICATIONS

This application claims the benefit of priority from the Korean Patent Application No. 10-2011-0010253, filed with the Korean Intellectual Property Office on Feb. 1, 2011, the disclosure of which is incorporated herein by reference in its entirety.

BACKGROUND

1. Technical Field

A method and a system consistent with exemplary embodiments relate to distributing applications for publicizing businesses or distributing digital content such as electronic books (e-books) or videos, and more particularly, to a method and a system that automatically searches an application store for applications and content with a smart mobile device (mobile terminal) by which a user can download the desired applications.

2. Description of the Related Art

Generally, an Internet portal-based application store database (DB) is provided with DB tables, each including pages for presenting individually registered applications and digital content, such as e-books and videos, and unique identifiers corresponding to the respective pages. A business application installed on a user terminal can search the tables using the unique identifiers assigned by an application store operation server to relevant businesses and can then search for and provide applications or content for publicizing and introducing relevant businesses. Further, mobile smart devices based on the iPod Operating System (iOS) and the Android OS are designed to search for surrounding APs so as to realize wireless Fidelity (WiFi) connections, and are configured such that applications can be developed and installed which have the function of searching for the IP addresses and Media Access Control (MAC) addresses of APs that are currently accessible.

The user of the above-described smart device may personally access an application store via an AP and may view a list of applications or pieces of digital content belonging to a specific category, or may enter the name of content and search for the corresponding content. However, in the case of applications for publicizing and introducing small-scale businesses, or pieces of content which are not best sellers i.e., popular, when preliminary information about the name of the relevant content is not present, it is difficult for a user to personally search for the relevant content and obtain resulting pages, and most unpopular applications may be inefficiently distributed or may die out in the market without being publicized, due to prior-arrangement policies centered around a small number of pieces of popular content of the application store, thus preventing the unpopular applications from being widely used.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a method and a system for distributing digital content, which is configured such that when the mobile terminal of a user performs WiFi communication using surrounding access points (Aps), an application (App) store server provides identifiers with reference to a table related to a list of IP addresses of the APs, and a push notification (push Noti) server automatically provides a notification (hereinafter briefly referred to as "Noti"), so that the user can purchase or install applications or content from the App store server, thus enabling the utility of unpopular applications or content (hereinafter an application or content will be integrally referred to as 'content') of businesses to be efficiently and widely improved even if the user does not personally access and search an App store.

According to an aspect of an exemplary embodiment, there is provided a method of distributing digital content using a mobile terminal, including a mobile terminal searching for an internet Access Point (AP); and the mobile terminal transmitting to an application store a request for content. The request includes one or more addresses for the found internet access points. The mobile terminal receives the requested content from the application store. The content is selected based on the address in the request.

The mobile terminal may compare strengths of signals received from a plurality of internet access points and select closest one of the internet access points based on the signal strength. The mobile terminal may then obtain an address of the closest internet access point, and transmit the obtained address to the application store.

The mobile terminal may compare strengths of signals received from a plurality of internet access points and select at least two of the internet access points whose signal strength is greater or equal to a predetermined value. The mobile terminal may obtain respective addresses of the selected internet access points, and may transmit any one of the obtained addresses to the application store.

The application store may include a storage unit which stores a table that links respective unique identifiers to a plurality of addresses of respective internet access points. The application store may select at least one unique identifier which corresponds to the address provided by the mobile terminal based on the stored table, may transmits the selected one unique identifier to the mobile terminal. If the mobile terminal requests to connect with a web page that provides access to the content, where the web page corresponds to the unique identifier, the mobile terminal is provided with the web page which allows access to the content.

The method may further include transmitting by the application store respective unique identifiers corresponding to a plurality of IP addresses to the mobile terminal based on the stored table, and if a list of the received unique identifiers is displayed on a display screen of the mobile terminal, a user interface is provided in which a user selects one of the received unique identifiers, the mobile terminal requests to connect to a web page based on the selected unique identifier, and the application store provides the requested web page, which provides the content to the mobile terminal.

If at least one of the unique identifiers is received by the mobile terminal, the mobile terminal may transmit a notification request to a push server, may receive a notification from the push Noti server, and the mobile terminal may select an option in the notification, the option indicating a request to receive a corresponding web page.

The push server may include a storage unit which stores a table indicating whether an event which provides information about each terminal has been requested, and if the terminal information included in a message for the notification request received from the mobile terminal has been registered in the storage unit in advance of the request, the push server may provide a notification based on the notification request.

According to another aspect, a system for distributing digital content is provided. The system includes an application store server which provides the content to a mobile terminal. The application store server includes a reception unit which receives a request with an address from the mobile terminal when the mobile terminal obtains the address of a found interne access point and a content provision unit which searches and provides content corresponding to the request.

The mobile terminal may compare strengths of signals received from a plurality of internet access points, may obtain an address of an internet access point closest to the mobile terminal, and may transmit the address to the application store server.

The App store server may further include a transmission unit; and a storage unit which stores a table that links respective unique identifiers to a corresponding plurality of IP addresses, the content provision unit may search the storage unit for unique identifiers corresponding to the addresses, and may transmit the unique identifiers to the mobile terminal via the transmission unit in conformity with a communication protocol, and when a connection request for the received unique identifiers is received from the mobile terminal, the content provision unit may provide a corresponding web page which provides the content to the mobile terminal via the transmission unit in conformity with a communication protocol.

The content provision unit may search the database for respective unique identifiers corresponding to a plurality of IP addresses and transmit found unique identifiers to the mobile terminal via the transmission unit in conformity with a communication protocol, and when a connection request for a unique identifier selected from a list of the received unique identifiers is received from the mobile terminal, the content provision unit may provide a web page for providing the content to the mobile terminal via the transmission unit in conformity with a communication protocol.

The mobile terminal may include a processing unit which controls the mobile terminal such that, when the unique identifier is received, a notification request is transmitted by the mobile terminal to a push server, and a notification is received from the push server, and the notification is displayed on a display screen of the mobile terminal; and a web page activation unit, which when a user selects to make a connection request, receives and displays the web page provided by the application store server.

BRIEF DESCRIPTION OF THE DRAWINGS

The above and other aspects and features of exemplary embodiments will be more clearly understood from the following detailed description taken in conjunction with the accompanying drawings, in which:

FIG. 5 is a diagram illustrating information managed in the DB of the App store server according to an exemplary embodiment;

DETAILED DESCRIPTION

Hereinafter, exemplary embodiments will be described in detail with reference to the attached drawings, but the inventive concept is not limited or restricted by the exemplary embodiments.

Figure 1:
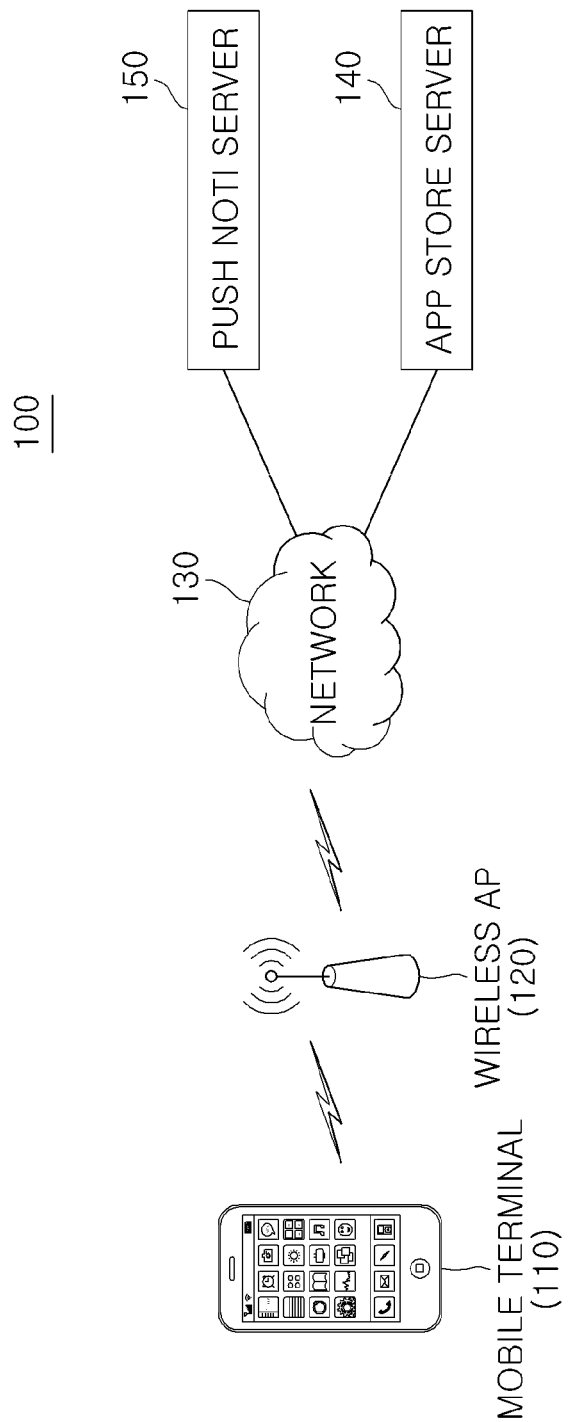
FIG. 1 is a diagram illustrating a system for distributing digital content such as an application according to an exemplary embodiment.

FIG. 1 is a diagram illustrating a system 100 for distributing digital content such as applications according to an exemplary embodiment.

Referring to FIG. 1, the system 100 for distributing digital content such as applications according to an exemplary embodiment includes a mobile terminal 110, a wireless Access Point (AP) 120, a network 130, an application store (App store) server 140, and a push notification (hereinafter referred to as 'Noti') server 150.

Here, the mobile terminal 110 is a terminal which can access the network 130 (for example, the Internet) according to a Wireless Fidelity (WiFi) protocol via the wireless AP 120 and can use a data service, and which may be, but is not limited to, a smart phone such as an ipod or an android phone, may be a portable or a mobile terminal such as a cellular phone capable of performing communication via the wireless AP 120, a Personal Communications Services (PC) phone, a synchronous/asynchronous International Mobile Telecommunication-2000 (IMT-2000) phone enabling wireless communication, a Personal Digital Assistant (PDA), a Wireless Application Protocol (WAP) phone, a mobile game console (mobile play-station), and other Portable Multimedia Players (PMPs), may also be a notebook personal computer (PC), a desktop PC, a Palm PC, or the like, and may include various electronic appliances or devices present over the entire society for home-use or business-use, capable of communicating with other electronic appliances depending on the circumstances.

The network 130 may be, but is not limited to, the Internet, may include a wireless mobile communication network such as a Wideband Code Division Multiple Access (WCDMA) or Wireless Broadband (WiBro) network, or may include a wired telephone network or the like depending on the circumstances. The mobile terminal 110 may be provided with a content service according to an exemplary embodiment while communicating with the App store server 140 and the push Noti server 150 over the above-described network. In this case, the content includes applications (App) (e.g., a game, a psychological test program, a video provision application, a biorhythm provision application, a program, etc.) that can be installed and executed on the mobile terminal 110 to provide interesting services to the user while performing bidirectional communication with the Internet server such as the App store server 140, or digital multimedia data such as images, e-books, or videos.

Using such a construction, exemplary system 100 is configured such that in the case where the mobile terminal 110 of the user performs WiFi communication using the surrounding AP 120, if the App store server 140 provides a unique identifier with reference to a table related to the Internet Protocol (IP) address list of the AP 120, the push Noti server 150 automatically provides a notification to allow the user to purchase or install content from the App store server 140, thus enabling efficient and wide-spread improvements in the utility of even the unpopular content of businesses even if the user does not personally access and search the App store. That is, the push Noti server pushes a message onto the mobile terminal 110. This message or notification allows access to unpopular and popular contents of various businesses that may be located near the mobile terminal 110.

Figure 2:
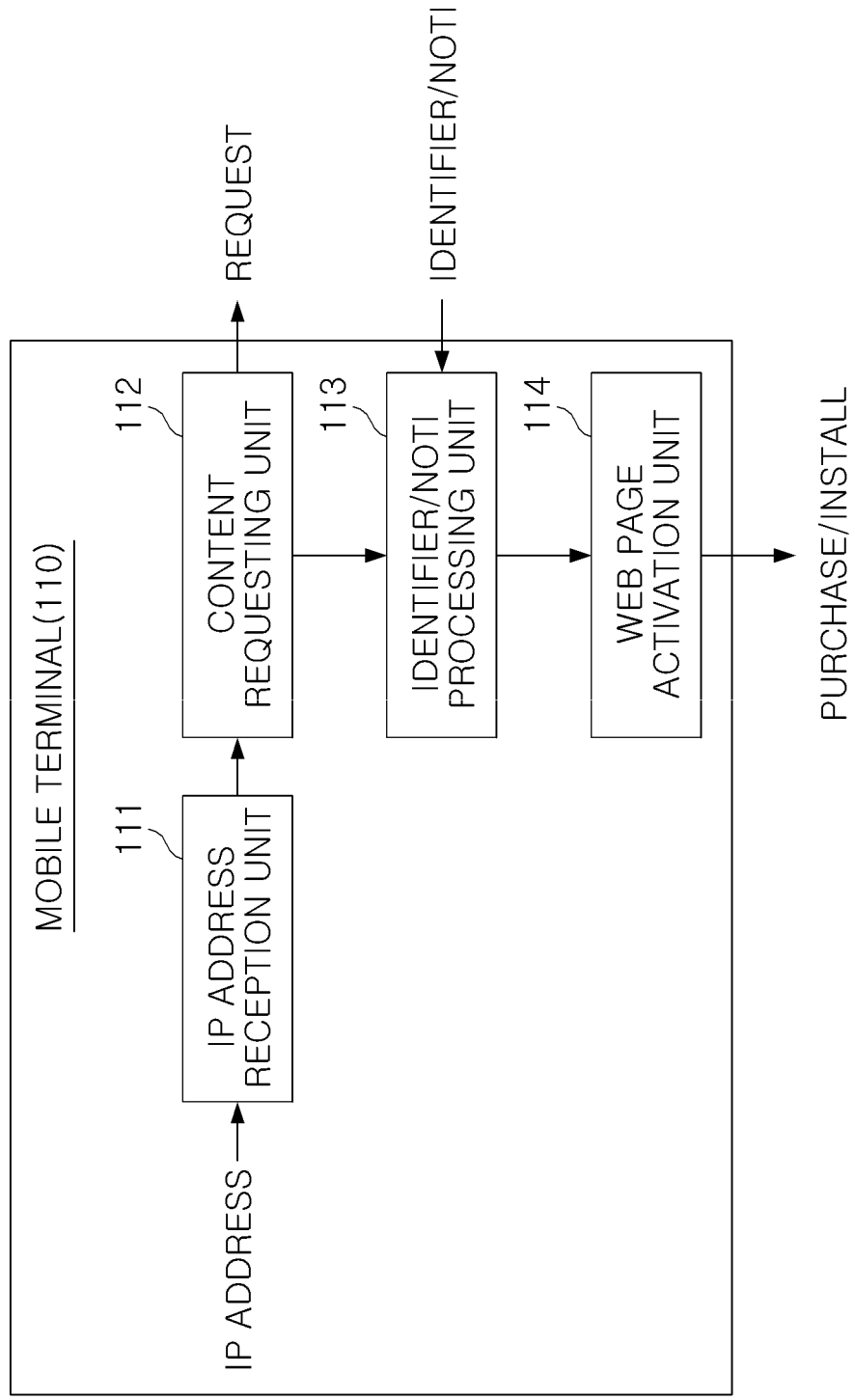
FIG. 2 is a diagram illustrating structure of a user terminal according to an exemplary embodiment.

FIG. 2 is a diagram illustrating the structure of the mobile terminal 110 according to an exemplary embodiment.

Referring to FIG. 2, the mobile terminal 110 according to an exemplary embodiment includes an IP address reception unit 111, a content requesting unit 112, an identifier/notification (Noti) processing unit 113, and a web page activation unit 114. This exemplary structure of the mobile terminal 110 may be implemented as software, hardware, or a combination thereof, and may be the configuration of a client that is downloaded from a web server or the like over the network 130 and is installed in the form of an application (App), and the client installed on the OS-based mobile terminal 110 supporting multitasking may be executed in background mode and may always be executed and operated. The exemplary mobile terminal 110 includes at least a micro-processor (not shown) and a memory.

The mobile terminal 110 searches for the surrounding wireless AP 120 using a device or an application for WiFi communication, and exchanges with the found AP 120 the signals required for authentication or the like, thus being provided with various types of communication services (calls, Internet browsing, data downloading, etc.) over the network 130 using the WiFi communication. The mobile terminal 110 connects to the wireless AP 120 that has the strongest signal. In this case, the mobile terminal 110 can obtain the IP address of the AP 120 from the AP 120. In particular, the mobile terminal 110 may obtain the IP address of an AP closest thereto by comparing the strengths of signals received from a plurality of surrounding APs 120. For example, the mobile terminal 110 may measure received signal strengths such as Received Signal Strength Indication (RSSI) values from signals received from a plurality of surrounding APs 120 using a predetermined detector, may then select an AP having the highest RSSI value, that is, the closest AP, from among the Aps. The mobile terminal 110 performs WiFi communication with the selected AP and obtains the IP address of the selected AP. In addition, the mobile terminal 110 can obtain respective IP addresses of all of the surrounding APs 120, from which signals having strengths equal to or greater than a predetermined value have been received.

As described above, the IP address reception unit 111 receives the IP addresses obtained for example as described above via the device or the application for WiFi communication.

The content requesting unit 112 sends a request message including the obtained IP addresses to the App store server 140.

Figure 6:
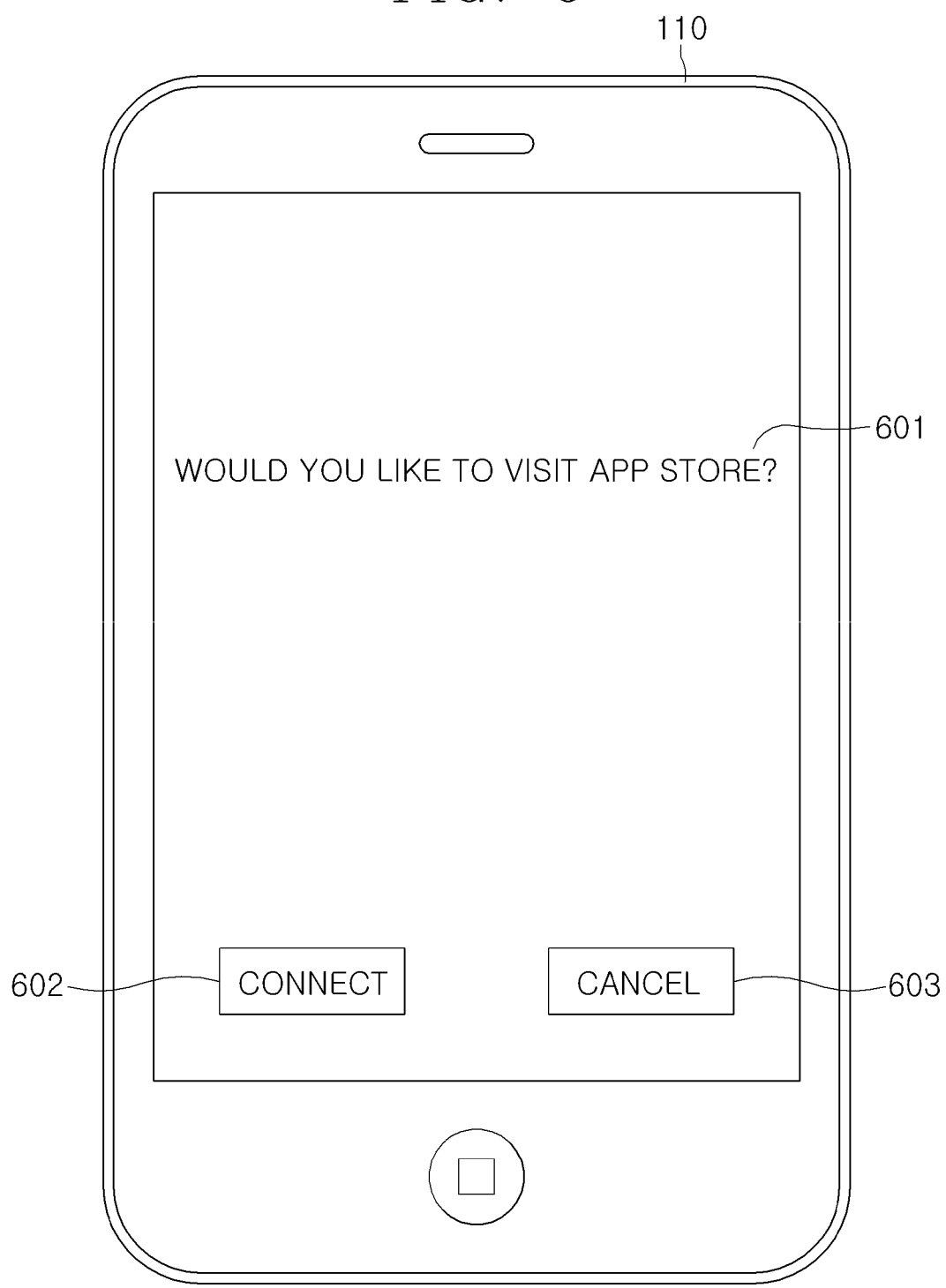
FIG. 6 is a diagram illustrating an example of a notification provided by a push-notification server according to an exemplary embodiment.

When the App store server 140 searches for and transmits unique identifier(s) corresponding to relevant IP addresses included in the request message, the identifier/Noti processing unit 113 performs control such that it receives the unique identifier(s), sends a Noti-request message to the push Noti server 150 depending on the unique identifier(s), receives a relevant notification from the push Noti server 150, and displays the received notification on a display screen (refer to FIG. 6). Here, the App store server 140 may include a DB for storing a table (refer to FIG. 5) related to unique identifiers corresponding to a plurality of IP addresses, search the DB for unique identifier(s) corresponding to respective IP addresses, and transmit the found unique identifier(s) to the identifier/Noti processing unit 113. Further, the push Noti server 150 may include a DB for storing a table related to whether an event corresponding to information about each terminal has been requested, that is, the push Noti server 150 may have information of mobile terminals, for example, Mobile Station International ISDN (MSISDN) Numbers, to be allowed for a notification request, in the table. The push Noti server 150 may provide a relevant terminal with a notification for a relevant notification request when relevant terminal information included in a message for the above-described notification request received from the identifier/Noti processing unit 113 of the mobile terminal 110 has already been registered on the DB to request an event.

The web page activation unit 114 receives a relevant web page provided by the App store server 140 and displays the received web page on the display screen via a browser or the like when a connection request button (refer to 'connect' in FIG. 6) on the display screen is selected.

Figure 3:
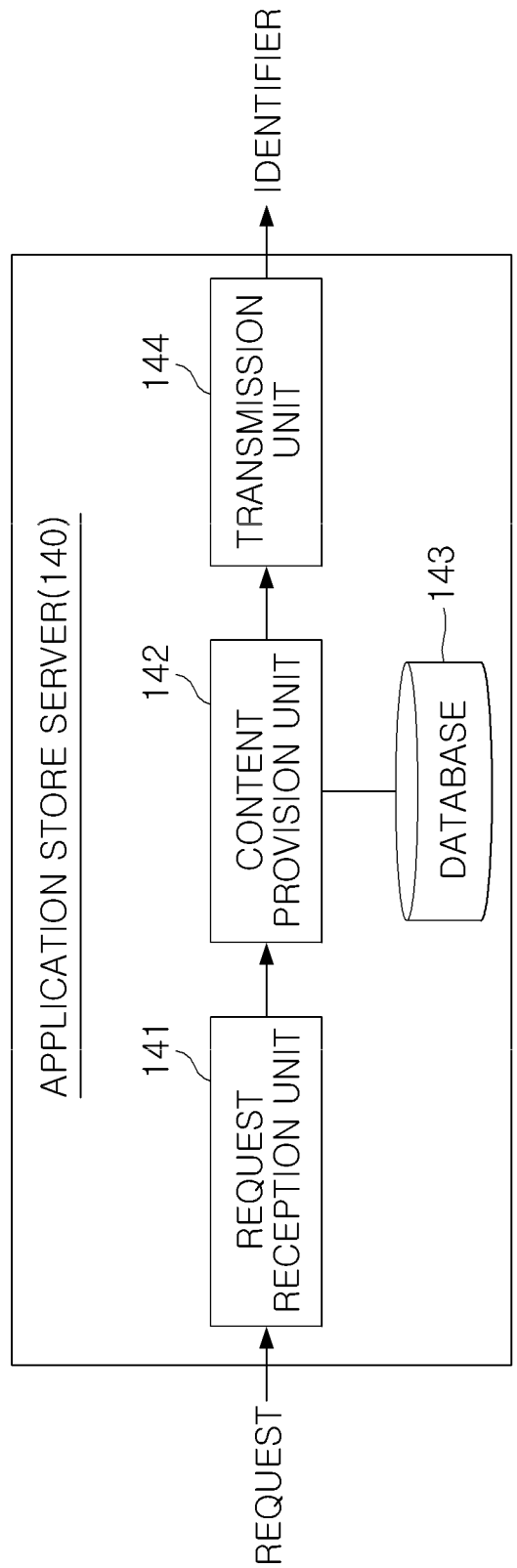
FIG. 3 is a diagram illustrating structure of the App store server according to an exemplary embodiment.

FIG. 3 is a diagram illustrating a structure of the App store server 140 according to an exemplary embodiment.

Referring to FIG. 3, the App store server 140 according to an exemplary embodiment includes a request reception unit 141, a content provision unit 142, a database (DB) 143, and a transmission unit 144.

The request reception unit 141 receives a relevant request message when the mobile terminal 110 obtains the IP addresses of APs 120 found in its surroundings and sends a request message including the IP address(es).

The content provision unit 142 searches for content corresponding to the request message received by the request reception unit 141 as described above, and provides the found content. As shown in FIG. 5, the DB 143 stores a table related to respective unique identifiers corresponding to a plurality of IP addresses, and the content provision unit 142 searches the DB 143 for unique identifier(s) corresponding to the IP addresses in the request message received by the request reception unit 141. The transmission unit 144 may transmit relevant unique identifiers to the mobile terminal 110 in conformity with a communication protocol supported by the network 130.

Further, when the unique identifiers are transmitted to the mobile terminal 110 in this way, the mobile terminal 110 may send a Noti-request message to the push Noti server 150, receive a relevant notification from the push Noti server 150, and display the received notification on the display screen (refer to FIG. 6). On the above-described display screen (refer to FIG. 6), the user may select a connection request button (refer to 'connect' in FIG. 6). Accordingly, the content provision unit 142 searches the DB 143 for a web page which will provide content when a relevant connection request (a connection request for a relevant unique identifier) is received from the mobile terminal 110, and the transmission unit 144 may provide the relevant web page to the mobile terminal 110 in conformity with a communication protocol supported by the network 130.

Figure 4:
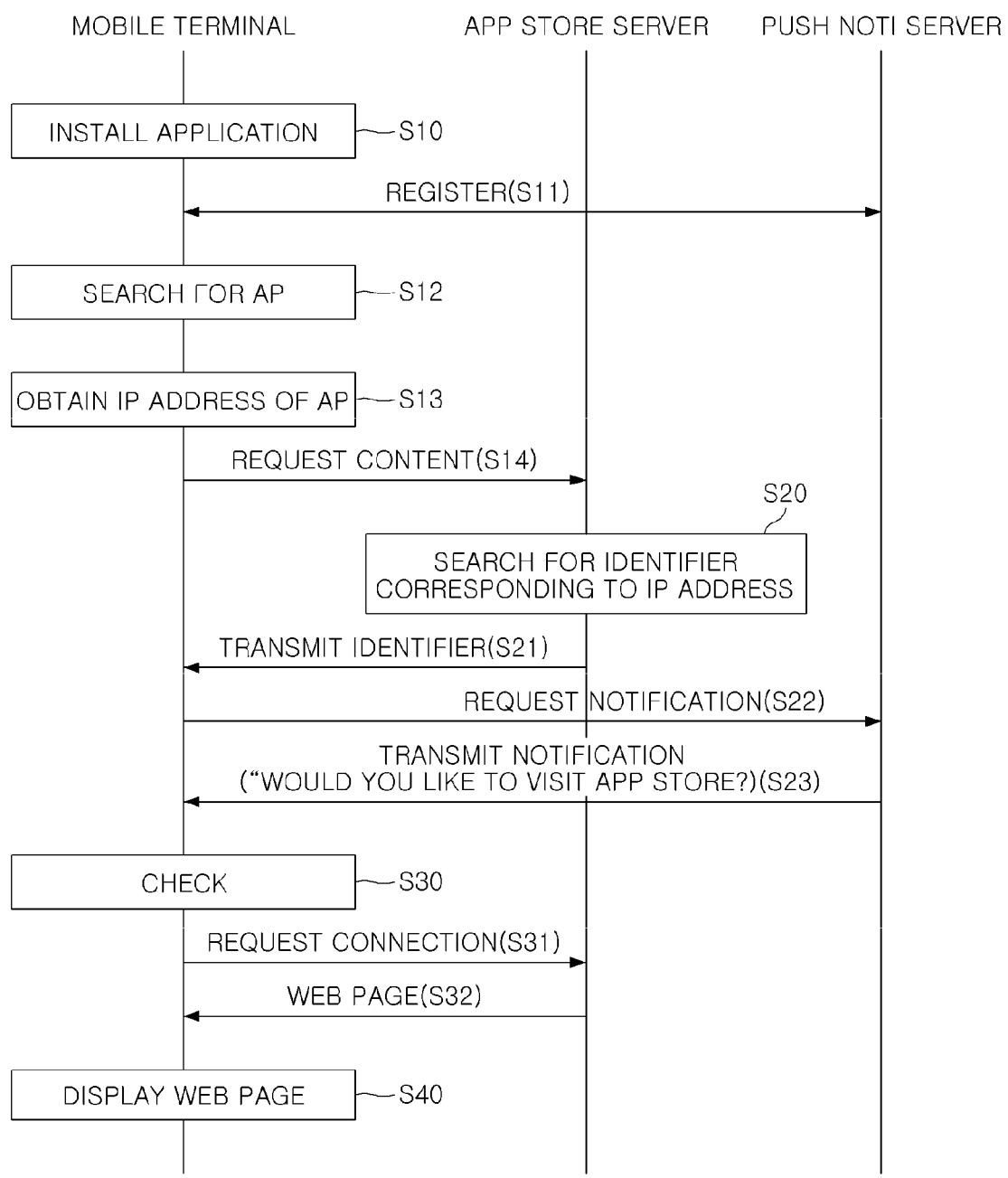
FIG. 4 is a flowchart illustrating a method distributing digital content according to an exemplary embodiment.

Hereinafter, a method of distributing the digital content according to an exemplary embodiment will be described in detail with reference to the flowchart of FIG. 4.

First, at operation S10, an application (App) may be downloaded from a web server or the like via the network 130 and may be installed on the mobile terminal 110 so that the application may be operated as the component of the client, as shown in FIG. 2. The above-described client installed on the OS-based mobile terminal 110 supporting multitasking may be executed in background mode and may always be operating.

When the client having the structure such as the one shown in FIG. 2 is installed on the mobile terminal 110, the installation of the client may be registered on the push Noti server 150 in operation S11. For example, the push Noti server 150 may receive information about individual terminals and information about whether events have been requested from the mobile terminals on which the above-described client is installed, and may register and store in advance the received information in the DB. This operation is performed in order for the push Noti server 150 to provide a relevant notification (for example, "Would you like to visit the App store?" or the like) when an event related to a Noti-request made by the mobile terminal 110 in operation S22, which will been described later, is generated.

Thereafter, the mobile terminal 110 searches for a surrounding wireless AP 120 using a device or an application for WiFi communication, and exchanges signals required for authentication or the like with the found AP 120, thus being provided with various types of communication services (calls, Internet browsing, data downloading, etc.) over the network 130 using WiFi communication in operation S12. In this case, the mobile terminal 110 may obtain the IP address of the AP 120 from the AP 120. In particular, the mobile terminal 110 may compare the strengths (for example, Received Signal Strength Indication: RSSI) of signals received from a plurality of surrounding APs 120 and may then select the IP address of an AP closest to the mobile terminal 110. In addition, the mobile terminal 110 may obtain the IP addresses of all of a plurality of surrounding APs 120 from which signals having strengths equal to or greater than a predetermined value have been received.

Accordingly, the IP address reception unit 111 of FIG. 2 receives IP address(es) obtained in this way through the device or application for WiFi communication, as described above, in operation S13. The content requesting unit 112 sends a request message including the obtained IP addresses to the App store server 140 in operation S14.

Thereafter, the request reception unit 141 of FIG. 3 receives the above request message from the mobile terminal 110, and the content provision unit 142 searches the DB 143 for unique identifiers corresponding to the IP address(es) included in the request message received by the request reception unit 141 in operation S20. The transmission unit 144 may transmit the unique identifier(s) to the mobile terminal 110 in conformity with the communication protocol supported by the network 130 in operation S21. As shown in FIG. 5, the DB 143 stores in advance a table related to the unique identifiers corresponding to the respective IP addresses of the wireless APs. For example, as shown in FIG. 5, the IP address of the closest AP 501 found by the mobile terminal 110 may be 10.16.1.2, and the unique identifier 502 of content corresponding to the IP address may be 'OGADA Coffee'. The unique identifier 502 of the content 'OGADA Coffee' or the like may be used as abbreviated information of the web page address required to provide the web page as in the case of operation S32, which will be described later. The table of the DB 143 as shown in FIG. 5 is intended to describe an example, wherein information about IP addresses and the unique identifiers of content corresponding to the IP addresses may be stored and managed in different forms, and information about the categories and brand names of individual pieces of content may also be managed to correspond to the information about the respective IP addresses.

When the unique identifier(s) are transmitted to the mobile terminal 110 in this way, the identifier/Noti processing unit 113 sends a Noti-request message to the push Noti server 150 in operation S22 and then receives a relevant notification from the push Noti server 150 and displays the received notification on the display screen in operation S23. When the mobile terminal 110 receives a list of unique identifiers corresponding to the respective IP addresses of the plurality of surrounding APs from the App store server 140 (a list of unique identifiers corresponding to the respective IP addresses of the wireless APs, as shown in FIG. 5) in operation S21, the identifier/Noti processing unit 113 may perform control such that a list of the unique identifiers representing the content, corresponding to each unique identifier to be known as shown in FIG. 5, is displayed on the display screen. Using the screen on which the list of the unique identifiers is displayed, the user may select any one unique identifier from the list, and accordingly, the identifier/Noti processing unit 113 may send a Noti-request message for the selected unique identifier to the push Noti server 150 in operation S22, and may perform control such that it receives a relevant notification from the push Noti server 150 and displays the received notification on the display screen.

The push Noti server 150 may include a DB for storing a table related to whether an event corresponding to each piece of terminal information has been requested. When relevant terminal information, included in the above-described Noti-request message received from the identifier/Noti processing unit 113 of the terminal 110, has been previously registered in the DB to request an event, the notification for the notification request may be provided to the terminal. As shown in FIG. 6, the notification 601 received from the push Noti server 150, for example, "Would you like to visit the App store?" may be displayed on the screen of the mobile terminal 110, and in this case, a connect button 602 for accessing the relevant content (or the relevant unique identifier) or a cancel button 603 for canceling access to the content may be provided together with the notification 601.

On the above-described display screen, the user may select the connect button 602 to make a connection request (refer to 'connect' of FIG. 6) in operation S31. Accordingly, the content provision unit 142 of FIG. 3 searches the DB 143 for a relevant web page required to provide content when a relevant connection request (a request for connecting to the relevant unique identifier) is received from the mobile terminal 110, and the transmission unit 144 may provide the relevant web page to the mobile terminal 110 in conformity with the communication protocol supported by the network 130 in operation S32.

Accordingly, on the mobile terminal 110, the web page activation unit 114 runs a browser or the like, and may then receive the web page provided by the App store server 140 and display the web page on the display screen in operation S40. That is, the mobile terminal 110 may purchase or install application(s) from a provided web page. When the web page is displayed in this way, the user checks the presentation of digital content associated with the AP 120 currently being accessed on the relevant web page, and clicks a button for downloading/streaming implemented on the relevant page when desiring installation, downloading, or video streaming, thus automatically purchasing an application or content, installing or downloading the application or content free, or utilizing video streaming.

As described above, according to a method and system for distributing digital content using an App store and a wireless AP according to an exemplary embodiment, notifications are automatically provided to a mobile terminal that passes by various stores in which applications are installed even if a service provider does not perform separate advertising or publicity, thus allowing the user to select and purchase applications and content using notifications even if the user does not personally access and search an App store.

As described above, exemplary embodiments are merely exemplary and are not to be construed as limiting. The present teachings can be readily applied to other types of apparatus. Also, those skilled in the art can implement various changes and modifications from the above description of exemplary embodiments. The previous description of various exemplary embodiments is provided to enable a person skilled in the art to distribute business application and contents. Moreover, various modifications to these exemplary embodiments will be readily apparent to those skilled in the art, and the generic principles and specific examples defined herein may be applied to other embodiments. For example, some or all of the features of the different embodiments discussed above may be combined into a single embodiment. Conversely, some of the features of a single embodiment discussed above may be deleted from the embodiment. Therefore, the present invention is not intended to be limited to the exemplary embodiments described herein but is to be accorded the widest scope as defined by the features of the claims and equivalents thereof.

What is claimed is:

1. A method of distributing digital content using a mobile terminal, comprising:
    searching, by the mobile terminal, for a plurality of internet access points; and
    transmitting, by the mobile terminal, to an application store a request for content, wherein the request comprises a plurality of addresses including an address for each of the internet access points respectively, and
    receiving, by the mobile terminal, the requested content from the application store, wherein the content is selected based on the addresses in the request.

2. The method according to claim 1, further comprising:
    comparing, by the mobile terminal, signal strengths received from the plurality of internet access points;
    selecting a closest one of the plurality of the internet access points based on the signal strengths;
    obtaining the address of the closest one of the plurality of internet access points; and
    transmitting, from the mobile terminal to the application store, the obtained address.

3. The method according to claim 1, further comprising:
    comparing, by the mobile terminal, signal strengths received from a plurality of internet access points respectively;
    selecting at least two of the plurality of the internet access points whose respective signal strengths are greater than or equal to a predetermined value;
    obtaining, by the mobile terminal, respective addresses of the at least two selected internet access points, and
    transmitting, from the mobile terminal to the application store, at least one of the obtained addresses.

4. The method according to claim 1,
    wherein the application store comprises a storage unit which stores a table which links respective unique identifiers to a plurality of addresses of a plurality of respective internet access points,
    wherein the application store selects at least one unique identifier which corresponds to at least one of the addresses provided by the mobile terminal based on the stored table,
    wherein the application store transmits the selected one unique identifier to the mobile terminal, and
    wherein if the mobile terminal requests to connect with a web page that provides access to the content, where the web page corresponds to the unique identifier, the mobile terminal is provided with the web page which allows access to the content.

5. The method according to claim 4, further comprising:
    transmitting by the application store respective unique identifiers, corresponding to a plurality of IP addresses, to the mobile terminal based on the stored table, and
    wherein if a list of the received unique identifiers is displayed on a display screen of the mobile terminal, a user interface is provided in which a user selects one of the received unique identifiers, the mobile terminal requests to connect to the web page based on the selected unique identifier, and the application store provides the requested web page, which provides the content to the mobile terminal.

6. The method according to claim 4, wherein if at least one of the unique identifiers is received by the mobile terminal, the mobile terminal transmits a notification request to a push server, receives a notification from the push Noti server, and the mobile terminal selects an option in the notification, the option indicating a request to receive a corresponding web page.

7. The method according to claim 6, wherein the push server comprises a storage unit which stores a table indicating whether an event which provides information about each of a plurality of mobile terminals, including the at least one mobile terminal, has been requested, and wherein if the information included in a message for the notification request received from the at least one mobile terminal has been registered in the storage unit in advance of the request, the push server provides a notification based on the notification request.

8. The method according to claim 1,
    wherein the application store comprises a storage unit which stores a table which links respective unique identifiers to a plurality of addresses of a plurality of respective internet access points.

9. The method according to claim 1,
    wherein the application store selects at least one unique identifier which corresponds to at least one of the addresses provided by the mobile terminal based on a stored table which links respective unique identifiers to a plurality of addresses of a plurality of respective internet access points.

10. The method according to claim 1,
    wherein the application store transmits a selected one unique identifier to the mobile terminal.

11. The method according to claim 1,
    wherein if the mobile terminal requests to connect with a web page that provides access to the content, where the web page corresponds to a unique identifier, transmitted from the application store, the mobile terminal is provided with the web page which allows access to the content.

12. A system for distributing digital content, comprising:
    an application store server which provides the digital content to a mobile terminal,
    wherein the application store server comprises:
    a reception unit configured to receive a request with a plurality of addresses from the mobile terminal when the mobile terminal obtains the addresses of a plurality of internet access points; and
    a content provision unit which searches and provides content corresponding to the request.

13. The system according to claim 12, wherein the mobile terminal compares strengths of signals received from the plurality of internet access points, obtains the address of the internet access point closest to the mobile terminal, and transmits the address of the internet access point closest to the mobile terminal to the application store server.

14. The system according to claim 12, wherein the application store server further comprises:
   a transmission unit; and
   a storage unit, which stores a table which links respective unique identifiers corresponding to the plurality of addresses,
   wherein the content provision unit searches the storage unit for unique identifiers corresponding to the addresses, and transmits the unique identifiers to the mobile terminal via the transmission unit in conformity with a communication protocol, and
   wherein when a connection request for the received unique identifiers is received from the mobile terminal, the content provision unit provides a corresponding web page which provides the content to the mobile terminal via the transmission unit in conformity with the communication protocol.

15. The system according to claim 14, wherein the content provision unit searches the database for respective unique identifiers corresponding to a plurality of IP addresses, and transmits found unique identifiers to the mobile terminal via the transmission unit in conformity with the communication protocol, and
   when the connection request for a unique identifier selected from a list of the received unique identifiers is received from the mobile terminal, the content provision unit provides a web page for providing the content to the mobile terminal via the transmission unit in conformity with the communication protocol.

16. The system according to claim 14, wherein the mobile terminal comprises:
   a processing unit which controls the mobile terminal such that, when the unique identifier is received, a notification request is transmitted by the mobile terminal to a push server, and when a notification is received from the push server, and the notification is displayed on a display screen of the mobile terminal; and
   a web page activation unit, which, when a user selects to make a connection request, receives and displays the web page provided by the application store server.

17. A method of distributing digital content using a mobile terminal, comprising:
   searching, by the mobile terminal, for an internet access point; and
   transmitting, by the mobile terminal, to an application store a request for content, wherein the request comprises an address of the internet access point, and
   receiving, by the mobile terminal, the requested content from the application store, wherein the content is selected based on the address in the request, wherein
   the application store comprises:
   a storage unit which stores a table which links respective unique identifiers to a plurality of addresses of a plurality of respective internet access points,
   wherein the application store selects at least one unique identifier which corresponds to the address provided by the mobile terminal based on the stored table,
   wherein the application store transmits the selected one unique identifier to the mobile terminal, and
   wherein if the mobile terminal requests to connect with a web page that provides access to the content, where the web page corresponds to the unique identifier, the mobile terminal is provided with the web page which allows access to the content.

18. A system for distributing digital content, comprising:
   an application store server which provides the digital content to a mobile terminal,
   wherein the application store server comprises:
   a reception unit configured to receive a request with an address from the mobile terminal when the mobile terminal obtains the address of an internet access point; and
   a content provision unit which searches and provides content corresponding to the request;
   wherein the application store server further comprises:
   a transmission unit; and
   a storage unit, which stores a table which links respective unique identifiers corresponding to a plurality of addresses,
   wherein the content provision unit searches the storage unit for a unique identifier corresponding to the address of the internet access point, and transmits the unique identifiers to the mobile terminal via the transmission unit in conformity with a communication protocol, and
   wherein when a connection request for the received unique identifiers is received from the mobile terminal, the content provision unit provides a corresponding web page which provides the content to the mobile terminal via the transmission unit in conformity with the communication protocol.

* * * * *